(12) United States Patent
Gurwicz et al.

(10) Patent No.: US 11,698,930 B2
(45) Date of Patent: Jul. 11, 2023

(54) TECHNIQUES FOR DETERMINING ARTIFICIAL NEURAL NETWORK TOPOLOGIES

(71) Applicant: INTEL CORPORATION, Santa Clara, CA (US)

(72) Inventors: Yaniv Gurwicz, Givataim (IL); Raanan Yonatan Yehezkel Rohekar, Tel Aviv (IL); Shami Nisimov, Newe-Ziv (IL); Guy Koren, Haifa (IL); Gal Novik, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 1256 days.

(21) Appl. No.: 16/014,495

(22) Filed: Jun. 21, 2018

(65) Prior Publication Data

US 2019/0042917 A1    Feb. 7, 2019

(51) Int. Cl.
*G06F 16/901*    (2019.01)
*G06N 3/082*    (2023.01)
(Continued)

(52) U.S. Cl.
CPC ...... *G06F 16/9024* (2019.01); *G06F 16/9027* (2019.01); *G06F 18/2137* (2023.01);
(Continued)

(58) Field of Classification Search
CPC ...... G06N 3/0454; G06N 3/082; G06N 5/003; G06N 7/005; G06N 3/0472;
(Continued)

(56) References Cited

U.S. PATENT DOCUMENTS 11,138,516 B2 * 10/2021 Harris ................. G06N 3/0445
2016/0301771 A1 * 10/2016 Choudhari ............. H04L 67/01
(Continued)

OTHER PUBLICATIONS

Yehezkel et al. "Bayesian Network Structure Learning by Recursive Autonomy Identification", 2009, Journal of Machine Learning Research 10 (2009) 1527-1570 (Year: 2009).*
(Continued)

*Primary Examiner* — Michael J Huntley
*Assistant Examiner* — Imad Kassim
(74) *Attorney, Agent, or Firm* — KDW Firm PLLC

(57) ABSTRACT

Various embodiments are generally directed to techniques for determining artificial neural network topologies, such as by utilizing probabilistic graphical models, for instance. Some embodiments are particularly related to determining neural network topologies by bootstrapping a graph, such as a probabilistic graphical model, into a multi-graphical model, or graphical model tree. Various embodiments may include logic to determine a collection of sample sets from a dataset. In various such embodiments, each sample set may be drawn randomly for the dataset with replacement between drawings. In some embodiments, logic may partition a graph into multiple subgraph sets based on each of the sample sets. In several embodiments, the multiple subgraph sets may be scored, such as with Bayesian statistics, and selected amongst as part of determining a topology for a neural network.

15 Claims, 12 Drawing Sheets

(51) Int. Cl.
G06F 18/2137 (2023.01)
G06F 18/21 (2023.01)
G06N 3/045 (2023.01)
G06N 5/01 (2023.01)
G06N 7/01 (2023.01)

(52) U.S. Cl.
CPC ......... G06F 18/2163 (2023.01); G06N 3/045 (2023.01); G06N 3/082 (2013.01); G06N 5/01 (2023.01); G06N 7/01 (2023.01)

(58) Field of Classification Search
CPC ............ G06F 16/9024; G06F 16/9027; G06K 9/6251; G06K 9/6261; G06V 10/82
See application file for complete search history.

(56) References Cited

U.S. PATENT DOCUMENTS

| | | |
|---|---|---|
| 2017/0364799 A1 | 12/2017 | Liu |
| 2018/0197069 A1* | 7/2018 | Reimann ............. G06N 3/08 |
| 2019/0228312 A1* | 7/2019 | Andoni ............. G06N 3/0454 |

OTHER PUBLICATIONS

Friedman et al. "Data analysis with Bayesian networks: A bootstrap approach", 2013, Proc Fifteenth Conf on Uncertainty in Artificial Intelligence (UAI). (Year: 2013).*

Raanan et al. "Constructing Deep Neural Networks by Bayesian Network Structure Learning", 2018 (Year: 2018).*

A. Quek, Z. Wang, J. Zhang and D. Feng, "Structural Image Classification with Graph Neural Networks," 2011 International Conference on Digital Image Computing: Techniques and Applications, 2011, pp. 416-421, doi: 10.1109/DICTA.2011.77. (Year: 2011).*

Junfeng Fang et al. ("Cooperative Explanations of Graph Neural Networks", Jul. 2017) (Year: 2017).*

Martin Wistuba: "Bayesian Optimization Combined with Incremental Evaluation for Neural Network Architecture Optimization", Proceedings of the International Workshop on Automatic Selection, Configuration and Composition of Machine Learning Algorithms, vol. Vol-1998, Jul. 22, 2017 (Jul. 22, 2017), pp. 2-11, XP055637464, http://ceur-ws.org/Vol-1998/paper_01.pdf.

Kirthevasan Kandasamy et al: "Neural Architecture Search with Bayesian Optimisation and Optimal Transport", arxiv.org, Cornell University Library, 201 Olin Library Cornell University Ithaca, NY 14853, Feb. 11, 2018 (Feb. 11, 2018).

Hanxiao Liu et al: "Hierarchical Representations for Efficient Architecture Search", arxiv.org, Cornell University Library, 201 Olin Library Cornell University Ithaca, NY 14853, Nov. 1, 2017 (Nov. 1, 2017).

Raanan Y Rohekar et al: "Constructing Deep Neural Networks by Bayesian Network Structure Learning" Network arxiv.org, Cornell University Library, 201 Olin Library Cornell University Ithaca, NY 14853, Jun. 24, 2018 (Jun. 24, 2018).

European Search Report and Written Opinion for the European Patent Application No. EP19175266, dated Oct. 30, 2019, 7 pages.

* cited by examiner

200

300A

300B

FIG. 3C
300C
Subgraph collection 340
Subgraph set 332-1 →
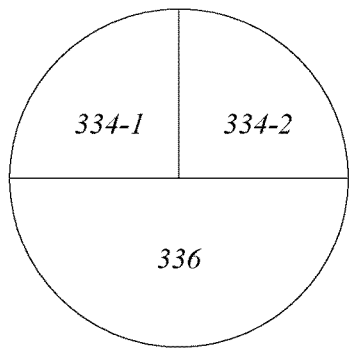
Subgraph set 332-2 →
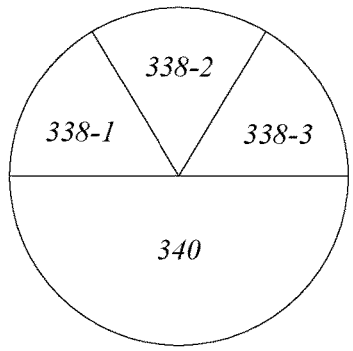
Subgraph set 332-T →
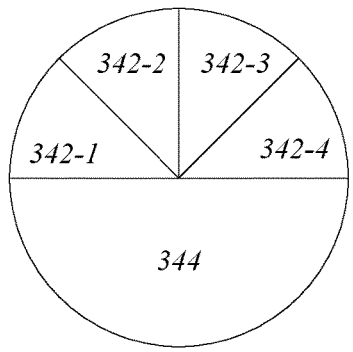

Determine a collection of sample sets from a data set, each sample set in the collection of sample sets drawn randomly from the data set with replacement between drawings
602

Partition a graph into a first set of subgraphs based on a first sample set in the collection of sample sets
604

Partition the graph into a second set of subgraphs based on a second sample set in the collection of sample sets, the second sample set different than the first sample set
606

Determine a topology for a neural network based at least in part on the first set of subgraphs and the second set of subgraphs
608

FIG. 7

Storage Medium 700

*Computer Executable Instructions for 500*

*Computer Executable Instructions for 600*

TECHNIQUES FOR DETERMINING ARTIFICIAL NEURAL NETWORK TOPOLOGIES

BACKGROUND

Artificial neural networks, or simply neural networks, generally refer to computing systems that are inspired by biological neural networks, such as animal brains. Typically, neural networks progressively improve performance on a task by considering examples of the task. For instance, in image recognition, a neural network may learn to identify images that contain cats by analyzing learning materials, such as example images that have been labeled as "cat" or "no cat", and using the results to identify cats in other images. Usually, the neural network evolves its own set of relevant characteristics of the images from the learning material they process without any prior knowledge about the task. Accordingly, in the above instance, the neural network may evolve a set of relevant characteristics to determine whether an image includes a cat without any prior knowledge about cats (e.g., they have fur, tails, whiskers, etc.). Characteristically, neural networks include a collection of connected nodes, referred to as artificial neurons, that are modeled based on biological neurons. Connections between the nodes, a simplified version of a biological synapse, can transmits signals between connected nodes. The structure of the collection of artificial neurons and connections therebetween may be referred to as the topology of the neural network.

BRIEF DESCRIPTION OF THE DRAWINGS

FIG. 3C illustrates exemplary subgraph sets in a subgraph collection according to one or more embodiments described herein.

FIG. 6 illustrates an embodiment of a second logic flow.

FIG. 7 illustrates an embodiment of a storage medium.

DETAILED DESCRIPTION

Figure 1:
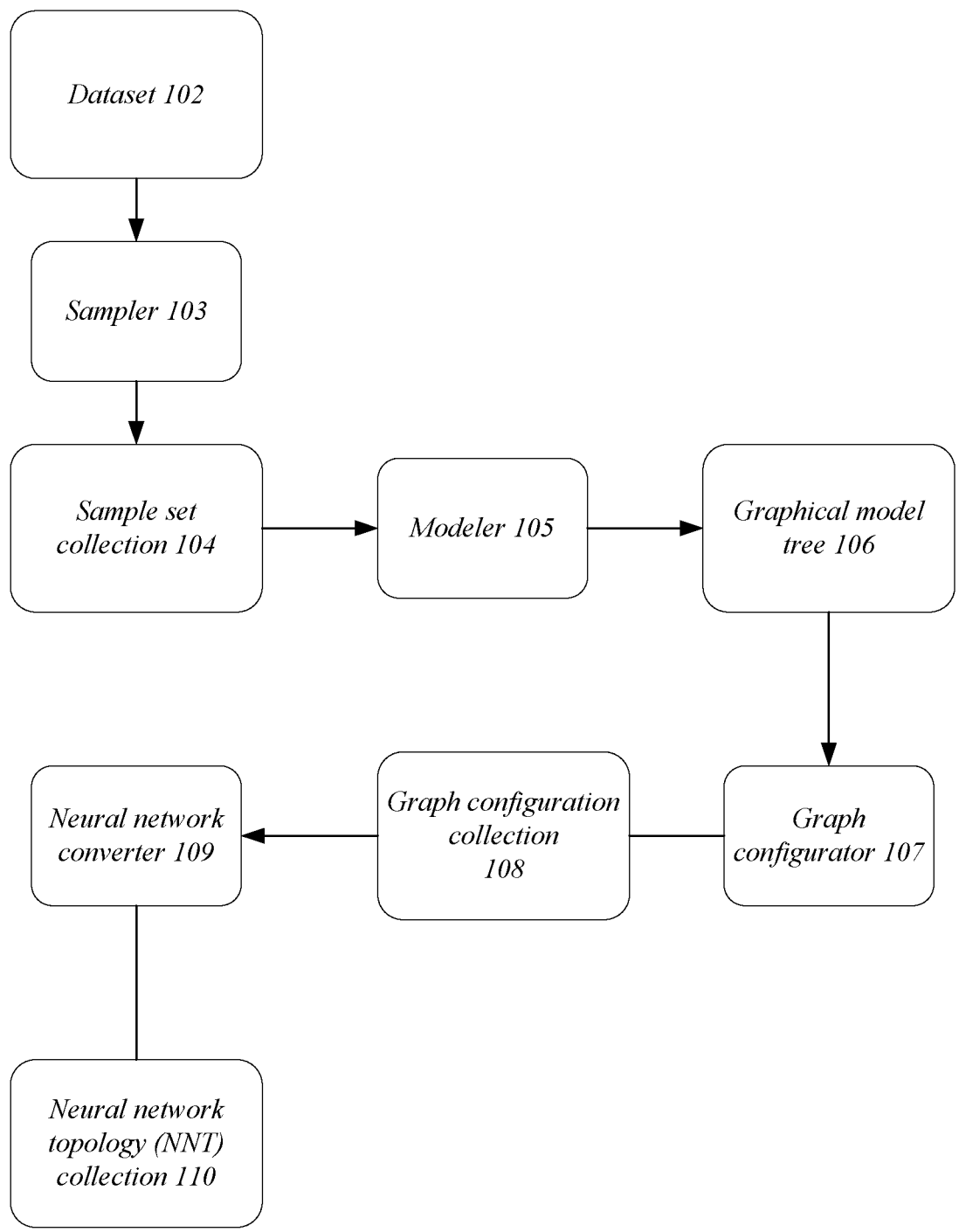
FIG. 1 illustrates an exemplary processing flow for determining a neural network topology according to one or more embodiments described herein.

Various embodiments are generally directed to techniques for determining artificial neural network topologies, such as by utilizing probabilistic graphical models, for instance. Some embodiments are particularly related to determining neural network topologies by bootstrapping a graph, such as a probabilistic graphical model, into a multi-graphical model, or graphical model tree. In one embodiment, for example, an apparatus may comprise a memory and logic for a first compute node, at least a portion of the logic implemented in circuitry coupled to the memory. In various embodiments, the logic may determine a collection of sample sets from a dataset. In various such embodiments, each sample set may be drawn randomly for the dataset with replacement between drawings. In some embodiments, the logic may partition a graph into multiple subgraph sets based on each of the sample sets. In several embodiments, the multiple subgraph sets may be scored, such as with Bayesian statistics, and selected amongst as part of determining a topology for a neural network. These and other embodiments are described and claimed.

Some challenges facing distributed processing systems include the inability to determine an optimized topology for a neural network in an efficient and reliable manner. These challenges may result from the absence of applicable computational methods and/or devices, resulting in the need to manually optimize a neural network. For instance, the topology or structure of the neural network may be built exhaustively with trial and error, causing excessive time to be wasted on erroneous assumptions. In some embodiments, optimization may require unnecessary amounts of computation (e.g., hundreds of graphics processing cards (GPUs)). For example, all possible structures in a space may be evaluated using reinforcement learning or evolutionary algorithms. In some embodiments, generic topologies (e.g., not customized for the dataset) may be utilized, resulting in sub-optimal performance.

Adding further complexity, some optimization procedures may constrain the search in ways that obscure the optimal solution, such with a greedy search mechanism. In some such instances, a local maximum may be identified instead of a global maximum. Additionally, or alternatively, these techniques may require superfluous amounts of data, such as manually labeled data. These and other factors may result in neural network topology design with poor efficiency and limited capabilities. Such limitations can reduce performance of a neural network, contributing to ineffective systems with reduced accuracy, excessive set-up times, and limited applicability.

Various embodiments described herein include a neural network topology systems and devices that can determine an optimized topology for a neural network in an effective, accurate, robust, and scalable manner. For instance, the topology may be customized based on the dataset. One or more embodiments described herein may improve one or more of classification/regression accuracy, stability (e.g., limiting effects of hyperparameter sensitivity, classification/regression uncertainty, computation efficiency, and memory efficiency). In several embodiments, accuracy and stability improvement may especially be true for smaller datasets. In some embodiments, an uncertainty/certainty value may be determined for one or more classification/regression decisions of the model (e.g., via an ensemble of separately structured neural networks). In some such examples, uncertainty values may be used in conjunction with self-driving cars and/or medical analysis. In various embodiments, computational efficiencies may be increased because, in the inference phase, only a single neural network may perform classification/regression rather than several classifiers/regressors (each with roughly similar complexity as that of a single neural network). In one or more embodiments, memory efficiencies may be increased because, neural network parameters (e.g., weights) of only a single neural network may be stored in memory, and also, or alternatively, during inference, only a single neural network may require memory allocation for feature maps.

Many embodiments described herein may include novel techniques for determining artificial neural network topologies, such as by utilizing probabilistic graphical models in conjunction with dataset sampling. In various embodiments, the dataset may require no labeling or reduced labeling. In one or more embodiments, topologies may be learned in an unsupervised manner. Some embodiments may efficiently and optimally determine neural network topologies by bootstrapping a graph, such as a probabilistic graphical model, into a multi-graphical model, or graphical model tree. In one or more embodiments, graphs determined based on the graphical model tree may be converted into topologies for neural networks. Several embodiments may produce and/or utilize an ensemble of different neural network topologies, leading to improved classification capabilities. In these and other ways, the neural network topology system may enable reliable and efficient optimization of neural networks to achieve improved performance and increased accuracy of the neural networks, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an example of a processing flow 100 that may be implemented, in part or in whole, by one or more devices, systems, and/or methods described herein in association with determining a neural network topology. Processing flow 100 may include dataset 102, sampler 103, sample set collection 104, modeler 105, graphical model tree 106, graph configurator 107, graph configuration collection 108, neural network converter 109, and neural network topology (NNT) collection 110. Many embodiments described herein may include one or more of determining a sample set collection 104 from the dataset 102 (e.g., with sampler 103), building the graphical model tree 106 based on the sample set collection 104 (e.g., with modeler 105), creating the graph configuration collection 108 by identifying one or more graphs from the graphical model tree 106 (e.g., with graph configurator 107), and converting one or more graphs in the graph configuration collection 108 into one or more neural network topologies and/or neural networks for the NNT collection 110 (e.g., with neural network converter 109). Embodiments are not limited in this context.

In one or more embodiments described herein, classification/regression accuracy and/or graphical model stability to hyperparameters may be improved by boot strapping. For instance, a stable graph may be more immune to the selection of hyperparameters that control the graph construction, and therefore may provide a higher fidelity to the data. In such instances, this may include benefits, such as (1) less time may be invested on searching for the optimal hyperparameters, and (2) a stable graph has a higher fidelity to the data, and therefore better represents the casual relations between nodes (features) in the graph. Additionally, or alternatively, accuracy and stabilization improvements may have the largest impact on smaller datasets.

In many embodiments, a neural network may be bootstrapped indirectly through the construction of an optimized graphical model. In some embodiments, bootstrapping may include a statistical technique that samples several subsets from a single given data set (e.g., sample set collection 104 from dataset 102), and then conducts the task (e.g., training a classifier, partitioning a subgraph) independently for each subset. In several embodiments, this may result in an ensemble of classifiers or subgraphs instead of one. In several such embodiments, a test sample may then be evaluated based on each of the classifiers/subgraphs independently, and the final decision may be based on the ensemble. In some embodiments described herein, probabilistic graphical model construction may be generated with bootstrapping to produce graphical model tree 106. As will be described in more detail below, in various embodiments, one or more optimized graphical models may be generated based on the graphical model tree 106.

In various embodiments, the dataset 102 may be utilized, such as by sampler 103, to determine sample set collection 104. For example, each sample set in sample set collection 104 may include one or more samples drawn/selected/determined from dataset 102. In many embodiments, a sample set may include a subset of the dataset 102. In some embodiments, samples drawn from dataset 102 may be selected at random. For instance, drawings may be randomized with a random number generator. In several embodiments, replacement may be utilized between each drawing. In other words, in various embodiments, when a value is drawn from a dataset, that value is included in the dataset when the next value is drawn from the dataset. In various embodiments, the number of samples in a sample set may be customized and/or optimized.

In some embodiments, the graphical model tree 106 may be generated based on the sample set collection and the dataset 102, such as by modeler 105. For instance, a graphical model, or graph, may be generated based on the dataset 102. The graph may then be partitioned into a plurality of subgraphs, referred to as a subgraph set. For example, the graph may be partitioned based on conditional independence testing. In such examples, the graph may be separately partitioned into a different subgraph set for each sample set in sample set collection 104.

In many embodiments, graphs/subgraphs may be partitioned into two main groups of subgraphs, the ancestor group and the descendant group. In various embodiments, the ancestor group of subgraphs may include several independent ancestor subgraphs, $A_i^n \in A^n$, where i is the index of the ancestor subgraph. In several embodiments, the descendent group may include a single subgraph, $D^n$. In one or more embodiments, each such $A_i^n$ and $D^n$ subgraph may be independently partitioned, which creates a new recursion level of n+1. In various embodiments, each subgraph $A_i^n$ and $D^n$ may include a set of variables that is dependent only on its exogeneous set and is independent of other subgraphs. In some embodiments, the nodes in the subgraph may include a mix of disconnected and connected nodes, directed and undirected arcs of one or more portions of the graph.

In some embodiments, each subgraph may be progressively partitioned (in a recursive manner) until a termination condition is satisfied to generate the graphical model tree 106 for dataset 102. For example, the number, T, of samples sets in sample set collection 104 may be used to generate T sets of partitions, or subgraph sets, for each subgraph in a subgraph set. In such examples, the may be performed for each subgraph at each recursion level, n (see e.g., FIGS. 3A-3D). Accordingly, the number of subgraphs in graphical model tree 106 may grow exponentially with the recursion level, n (see e.g., FIG. 4).

In many embodiments, graphs and/or subgraphs may be partitioned based on conditional independence testing of order n. In many such embodiments, the entire dataset may be used. For example, a conditional independence test (CIT) between any two variables may be conditioned of a set of n other variables (e.g., a mutual information (MI) of $I(X_3, X_5 | X_i, X_6, X_8)$ may be calculated between two variables, $(X_3, X_5)$, conditioned on the condition set of $(X_1, X_6, X_8)$ for n=3. In several embodiments described herein, for higher values of n, reliability of the joint probabilities (in MI) for the many variables (large n) in the given condition set may be increased by utilizing multiple sample sets of sample set collection 104 to recursively generate subgraphs. Often, this may improve classification/regression accuracy and graph stability.

In one or more embodiments, graph configuration collection 108 may be created by identifying one or more graphs from the graphical model tree 106, such as with graph configurator 107. In various embodiments, starting at the bottom of the graphical model tree 106 (i.e., max n), each subgraph set in each subgraph collection may be scored. In various such embodiments, the score may represent the likelihood of data, D, to be explained by the graph, G. For example, the score may be a Bayesian score (i.e., based on Bayesian statistics). In such examples, the Bayesian score may be decomposable into a level of pairs of variables and their parent set, $\{X_i, pa_i\}$, such that the marginal likelihood has the form of decomposability of Bayesian score:

$$P(D|G) = \prod_i \prod_{pa_i} \frac{\Gamma(\alpha_{pa_i})}{\Gamma(\alpha_{pa_i} + M(pa_i))} \prod_{x_i} \frac{\Gamma(\alpha_{x_i,pa_i} + M(x_i, pa_i))}{\Gamma(\alpha_{x_i,pa_i})} \quad (1)$$

where, $x_i$ are the possible values of variable $X_i$, $pa_i$ are the possible values of configurations of the parent set (of variable $X_i$, M( . . . ) are the counts from the data, D, and $\alpha_{..}$ are hyperparameters for each family, and $\Gamma$ is the gamma function.

In various embodiments, a subgraph to use in the next higher level (i.e., n−1) of the graphical model tree 106 may be selected based on the scores of the subgraph sets that were generated by partitioning the subgraph during construction of the graphical model tree 106. In various such embodiments, by repeating this process from the bottom (i.e., n max) to the top (i.e., n=0) an optimized graphical model or optimized graph for graph configuration collection 108 may be created. In one or more embodiments, a graph for graph configuration collection 108 may be identified by choosing the subgraph collection that corresponds to the subgraph at the next tree level (i.e., n+1) with the highest score.

In some embodiment, subgraphs may be selected to use in the next higher level of the graphical tree model 106 based on probabilities that correspond to associated subgraph set scores to identify graphs for graph configuration collection 108. In some such embodiments, an ensemble of graphs may be generated for graph configuration collection 108 with different structures selected based on the different probabilities of different structures being included in a graph. For example, the selected probability may be proportional to the corresponding normalized Bayesian score and/or relative to the Bayesian scores of neighboring subgraphs. In such examples, the probability distribution over the children subgraphs may be:

$$p(g = g_i) = \frac{Bs_i}{\sum_{i=1}^{T} Bs_i}, \forall\, i = 1, \ldots, T \quad (2)$$

In some such examples, a single graph may be sampled from this distribution. In various embodiments, these Bayesian scores may be computed from the original (before bootstrapping) data.

In many embodiments, after a subgraph is selected, the rest of the children subgraphs may be excluded, and the parent subgraphs accepts the subgraph partition of the selected subgraph. In one or more embodiments, this process may be performed for all of the subgraphs of the $(n-1)^{th}$ level ($A_i^{n-1}$ and $D^{n-1}$) in order to complete the entire structure of the $(n-1)^{th}$ level. This process may continue progressively upwards to the $(n-2)^{th}$ level until reaching the top (n=0 level), at which point the entire graph has be constructed. In various embodiments, this may result in a single sampled graph for graph configuration collection 108, that comprises children subgraphs, which have higher probability to be selected if their Bayesian score is high relative to other child subgraphs. In some embodiments, this process may be repeated K times (beginning from the same graphical model tree 106), to generate an ensemble of K graphs, $G=\{G_1, \ldots, G_K\}$, for graph configuration collection 108.

In some embodiments, the ensemble of graphs in graph configuration collection 108 may enable a corresponding ensemble of K neural network topologies, or neural networks, to be created for neural network topology (NNT) collection 110, such as with neural network converter 109. In many embodiments, NNT collection 110 may include a neural network and/or neural network topology corresponding to each graph in graph configuration collection 108. In various embodiments, inference may be calculated in an ensemble fashion. In one or more embodiments, an ensemble of neural networks may achieve more accurate inference results. In several embodiments, the ensemble of neural networks created from or comprising NNT collection 110 may enable confidence/certainty values to be provided. For example, the number of neural networks in NNT collection 110 that classify data the same may be converted into a confidence value for classification of the data. In some examples, uncertainty may be provided to a class (e.g., for classification), where the probability of each class can be a Monte Carlo estimation of the K outputs for that class resulting from the K networks, with the uncertainty being the standard deviation of those K outputs.

In another example, the Bayesian score distribution (from which subgraphs are sampled) may be replaced by a uniform distribution, to enable every subgraph an equal probability of being selected. As with Bayesian model averaging, each model may contribute to the averaging with a weight equal to the posterior probability of the model. However, in some embodiments, each of the T possible subgraphs may be constructed, given a different subset, $d_i$, $i \in \{1, \ldots, T\}$, and hence a uniform distribution over the posterior probability of the models may be assumed (i.e., $p(M_i|D_j)=1/T$). In another embodiment, the distribution over the prior probabilities of the models may be in proportion to the Bayesian score of each model, meaning that the models are chosen uniformly, but their contribution to the averaging is with respect to their Bayesian score.

Figure 2:
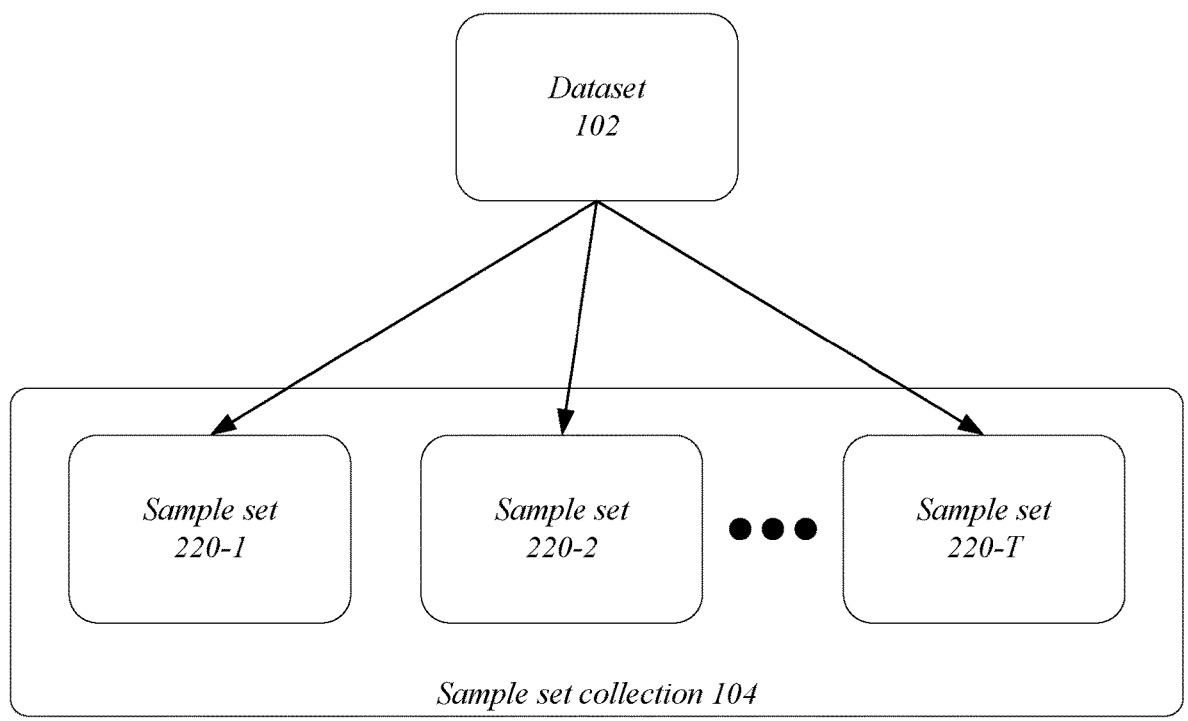
FIG. 2 illustrates an exemplary sample set collection according to one or more embodiments described herein.
Figure 3A:
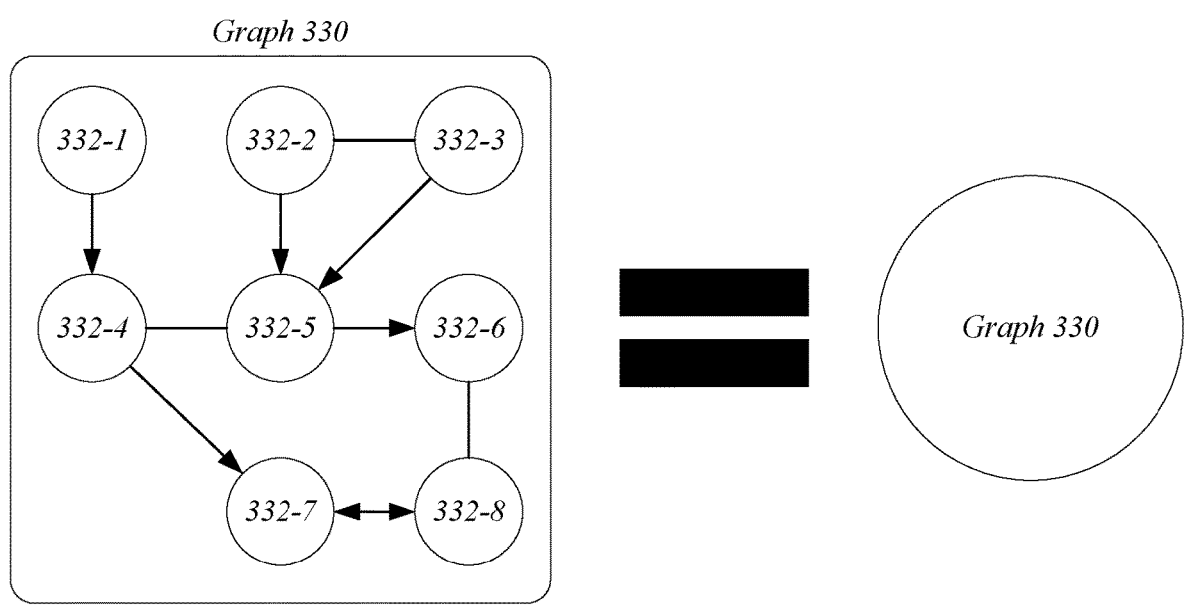
FIG. 3A illustrates an exemplary graph according to one or more embodiments described herein.
Figure 3B:
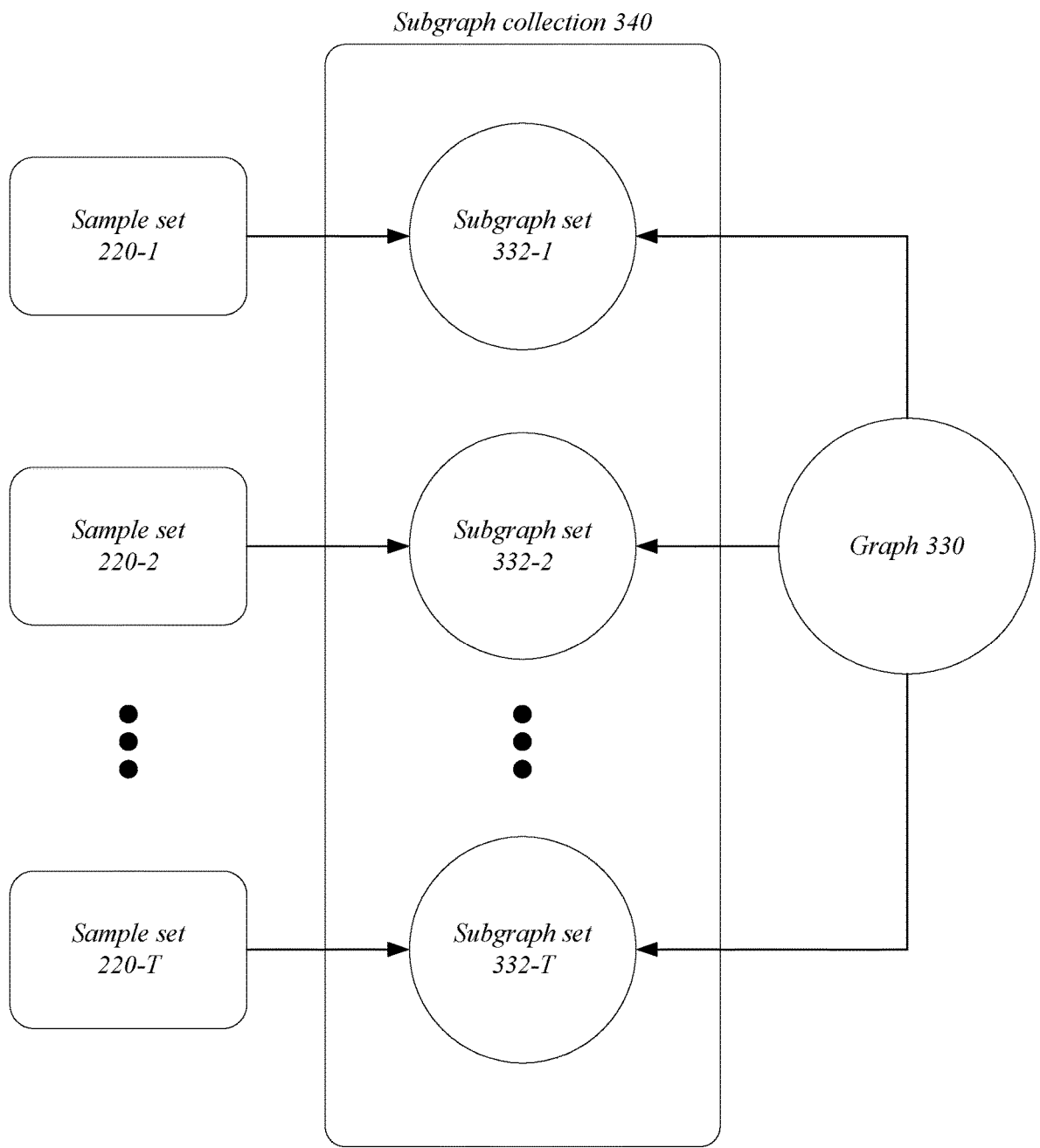
FIG. 3B illustrates an exemplary subgraph collection according to one or more embodiments described herein.
Figure 3D:
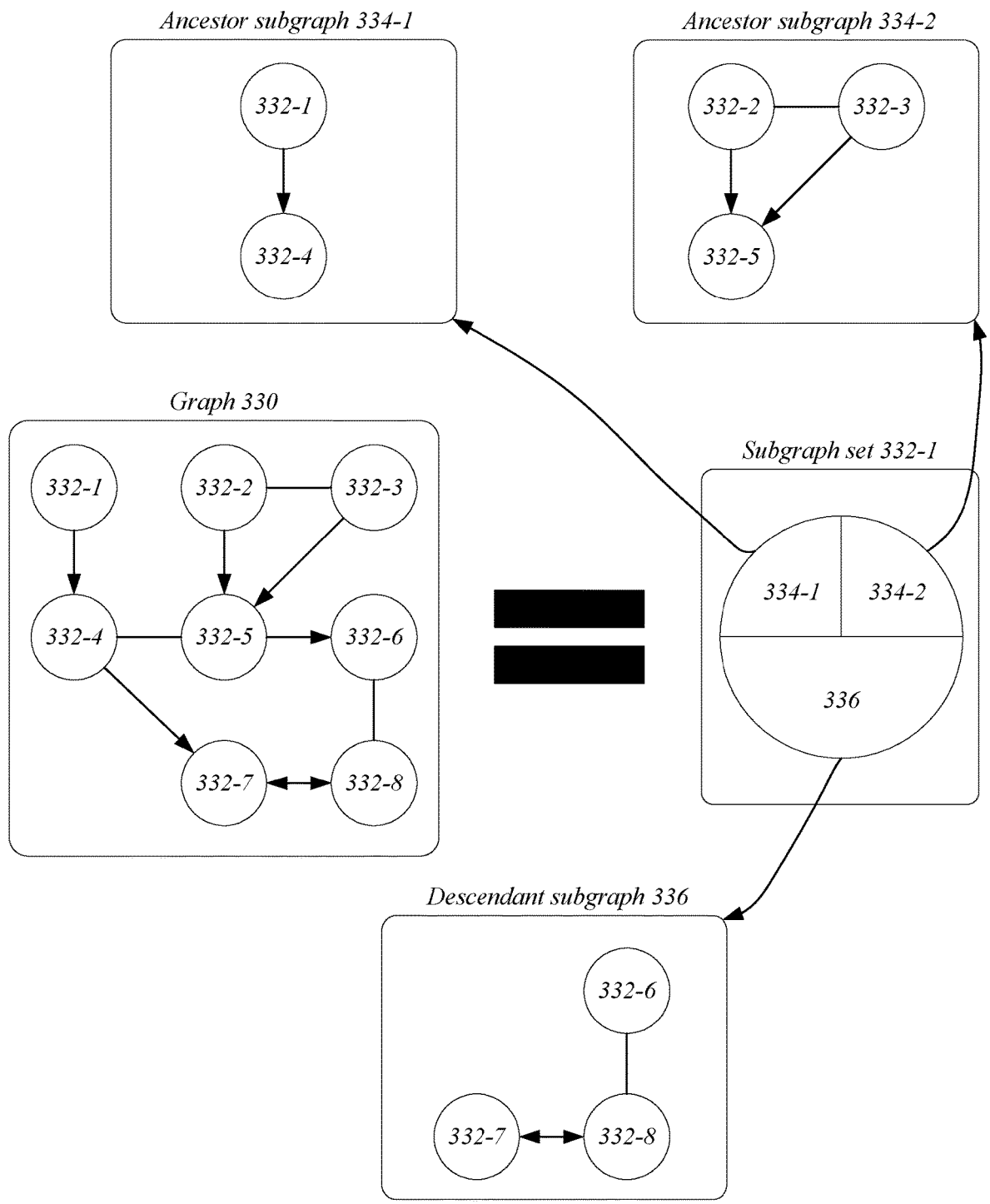
FIG. 3D illustrates exemplary subgraphs in a subgraph set of a graph according to one or more embodiments described herein.

FIG. 2 illustrates an example of an operating environment 200 that may be representative of various embodiments. Operating environment 200 may include dataset 102 and sample set collection 104 with samples sets 220-1, 220-2, 220-T (or sample sets 220). In one or more embodiments, each sample set in sample set collection 104 may be drawn randomly from dataset 102 with replacement between drawings. In various embodiments described herein, one or more graphs or subgraphs may be partitioned based on each sample set in the sample set collection 104 such that a number, T, independently partitioned subgraphs can be generated for each of one or more graphs or subgraphs. In many embodiments, sample sets 220 in sample set collection 104 may be utilized to generate and/or optimize a neural network topology, such as via bootstrapping. Embodiments are not limited in this context.

In various embodiments, the dataset 102 may be utilized to determine sample set collection 104 comprising sample sets 220. For example, each sample set 220-1, 220-2, 220-T in sample set collection 104 may include one or more samples drawn/selected/determined from dataset 102. In many embodiments, a sample set may include a subset of the dataset 102. In some embodiments, samples drawn from dataset 102 may be selected at random. For instance, drawings may be randomized with a random number generator or a pseudo random number generator. In several embodiments, replacement may be utilized between each drawing. In other words, in various embodiments, when a value is drawn from a dataset, that value is included in the dataset when the next value is drawn from the dataset. In various embodiments, the dataset 102 and/or sample sets 220 may require no labeling or reduced labeling.

In some embodiments, the number of samples in each sample set in sample set collection 104 may be the same. In various embodiments, the number of samples in a sample set may be customized and/or optimized. In various embodiments, the graphical model tree 106 may be generated based on the sample set collection 104 and the dataset 102. For instance, a graphical model, or graph, may be generated based on the dataset 102. In some instances, the graph (or any graph/subgraph) may be partitioned into a plurality of subgraphs, referred to as a subgraph set, with a subgraph set generated for each of the sample sets 220 in sample set collection 104. For example, the graph may be partitioned based on conditional independence testing. In such examples, the graph may be separately partitioned into a different subgraph set for each sample set 220-1, 220-2, 220-T in sample set collection 104.

FIGS. 3A-3D illustrate examples of operating environments 300A, 300B, 300C, 300D, that may be representative of various embodiments. In many embodiments, these operating environments may illustrate various aspects of building graphical model tree 106. Operating environment 300A may include a graph 330, or graphical model, comprising a plurality of nodes 332-1, 332-2, 332-3, 332-4, 332-5, 332-6, 332-7, 332-8 (or nodes 332) and connections therebetween. In operating environment 300A, graph 300 may be generated based on dataset 102. Operating environment 300B may include a subgraph collection 340 including a plurality of subgraph sets 332-1, 332-2, 332-T. In operating environment 300B, a subgraph set in subgraph collection 340 may be generated for each of sample sets 220 by separately partitioning the graph 330 based on each sample set. Accordingly, each subgraph set may include all nodes and connections of graph 330, but the nodes 332 and connections may be independently partitioned into a number of subgraphs comprised in the respective subgraph set. In operating environment 300C, each subgraph set 332-1, 332-2, 332-T in subgraph collection 340 may include a different partitioning. As illustrated, in subgraph set 332-1, graph 330 may be partitioned into subgraphs 334-1, 334-2, 336, in subgraph set 332-2, graph 330 may be partitioned into subgraphs 338-1, 338-2, 338-3, 340, and in subgraph set 332-T, graph 330 may be partitioned into subgraphs 342-1, 342-2, 342-3, 342-4, and 344. Operating environment 300D illustrates an example of graph 330 being partitioned into subgraph set 332-1. In operating environment 300D, subgraph set 332-1 may include a descendant subgraph 336 and ancestor subgraphs 334-1, 334-n. Embodiments are not limited in this context.

The operating environments 300A, 300B, 300C, 300D may include techniques for determining artificial neural network topologies, such as by utilizing probabilistic graphical models in conjunction with dataset sampling. Some embodiments may efficiently and optimally determine neural network topologies by bootstrapping graph 330, such as a probabilistic graphical model, into a multi-graphical model, such as graphical model tree 106. In one or more embodiments, optimized graphs determined based on the graphical model tree 106 may be converted into topologies for neural networks. Several embodiments may produce and/or utilize an ensemble of different neural network topologies, leading to improved classification capabilities. In these and other ways, neural network topology devices, systems, and techniques described herein may enable reliable and efficient optimization of neural networks to achieve improved performance and increased accuracy of the neural networks, or design thereof.

Referring to operating environment 300A, in several embodiments, graph 330, such as a probabilistic graphical model may be generated based on dataset 102. In various embodiments, graph 330 may include a collection of nodes 332 and connections. In various embodiments, connections between nodes may be referred to as arcs. In many embodiments, the graph 330 may include a mix of disconnected nodes, connected nodes, directed arcs, and/or undirected arcs. For example, the connection between node 332-2 and node 332-5 may be an undirected arc, the connection between node 332-1 and node 332-4 may be a one-way directed arc, and the connection between node 332-7 and node 332-8 may be a two-way directed arc. As will be appreciated, for clarity and ease of explanation, graph 330 may be illustrated without the collection of nodes 332 and connections, as shown in the right portion of FIG. 3A.

Referring to operating environment 300B, in various embodiments, graph 330 may be partitioned into a plurality of subgraph sets 332 in subgraph collection 340. In many embodiments, each subgraph set 332 in subgraph collection 340 may correspond to a separate partitioning of graph 330. In many such embodiments, the separate partitioning (i.e., subgraph sets 332-1, 332-2, 332-T) of graph 330 may be based on a corresponding one of sample sets 220. In some embodiments, the graphical model tree 106 may be generated based on the sample set collection and the dataset 102. For instance, a graphical model, or graph, may be generated based on the dataset 102. The graph may then be partitioned into a plurality of subgraphs, referred to as a subgraph set. For example, the graph may be partitioned based on conditional independence testing. In such examples, the graph may be separately partitioned into a different subgraph set for each sample set in sample set collection 104.

Referring to operating environment 300C, in many embodiments, graph 330 may be recursively partitioned into two main groups of subgraphs, the ancestor group and the descendant group. For example, in FIG. 3D, the ancestor group for subgraph set 332-1 may include subgraphs 334-1, 334-2, and the descendant group for subgraph set 332-1 may include descendant subgraph 336. Similarly, in FIG. 3C, the ancestor group for subgraph set 332-2 may include subgraphs 338-1, 338-2, 338-3 and the descendant group for subgraph set 332-2 may include descendant subgraph 340 and the ancestor group for subgraph set 332-T may include subgraphs 342-1, 342-2, 342-3, 342-4 and the descendant group for subgraph set 332-T may include descendant subgraph 344.

Referring to operating environment 300D, in various embodiments, the ancestor group of subgraphs may include several independent ancestor subgraphs, $A_i^n \in A^n$, where i is the index of the ancestor subgraph (e.g., ancestor subgraphs 334-1, 334-2). In several embodiments, the descendent group may include a single subgraph, $D^n$ (e.g., descendant subgraph 336). In one or more embodiments, each such $A_i^n$ and $D^n$ subgraph may be independently partitioned, which creates a new recursion level of n+1 (see e.g., FIG. 4). In various embodiments, each subgraph $A_i^n$ and $D^n$ may include a set of variables that is dependent only on its exogeneous set and is independent of other subgraphs. In some embodiments, the nodes and connections comprising each subgraph (e.g., ancestor subgraph 334-1, ancestor subgraph 334-2, and descendant subgraph 336) may include a mix of disconnected nodes, connected nodes, directed arcs, and undirected arcs that comprise one or more portions of graph 330.

In many embodiments, graphs and/or subgraphs may be partitioned based on conditional independence testing of order n. In many such embodiments, the entire dataset may be used. For example, a conditional independence test (CIT) between any two variables may be conditioned of a set of n other variables (e.g., a mutual information (MI) of $I(X_3, X_5|X_1, X_6, X_8)$ may be calculated between two variables, $(X_3, X_5)$, conditioned on the condition set of $(X_1, X_6, X_8)$ for n=3. In several embodiments described herein, for higher values of n, reliability of the joint probabilities (in MI) for the many variables (large n) in the given condition set may be increased by utilizing multiple sample sets of sample set collection 104 to recursively generate subgraphs. Often, this may improve classification/regression accuracy and graph stability.

Figure 4:
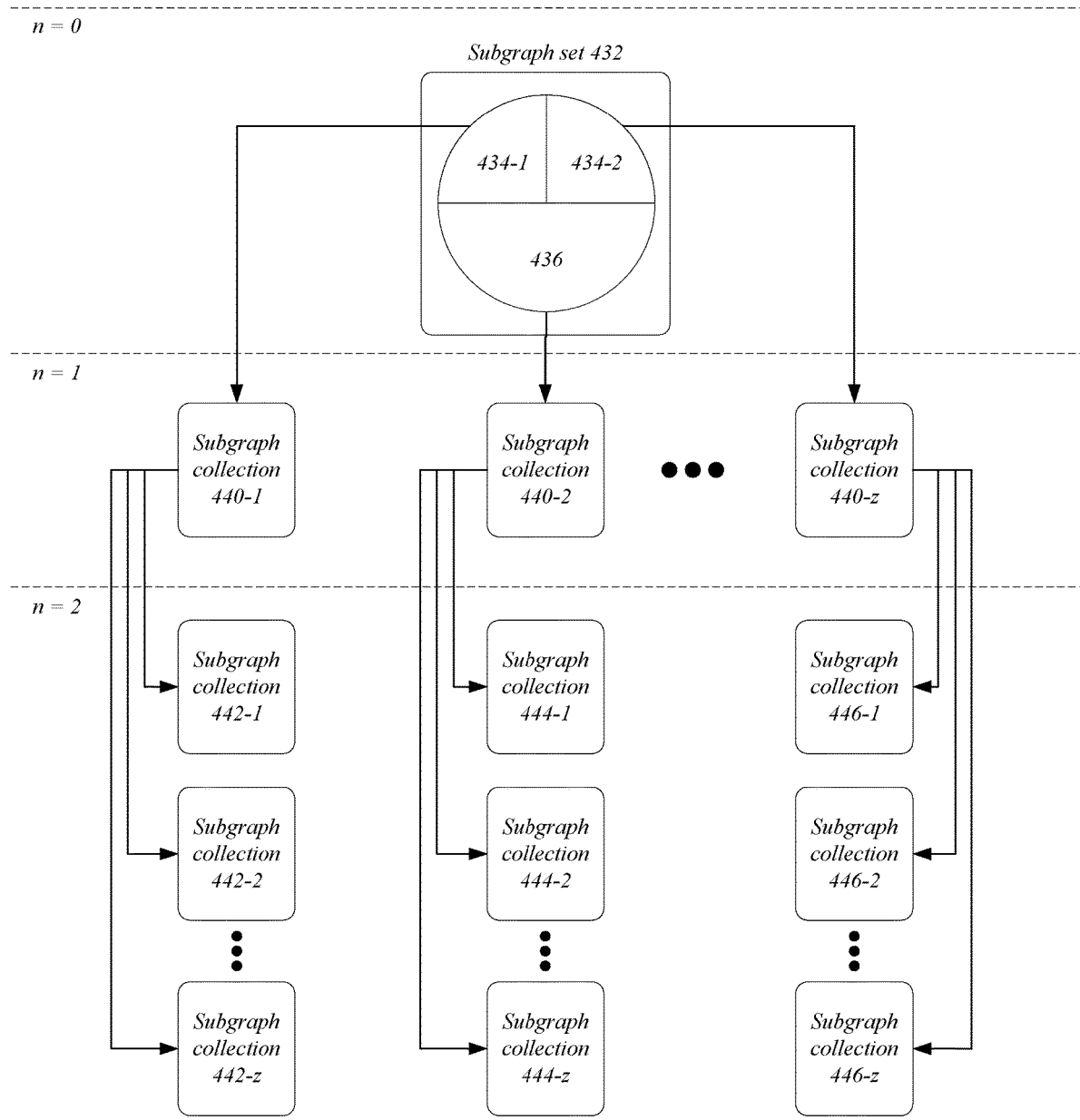
FIG. 4 illustrates an exemplary graphical model tree according to one or more embodiments described herein.

FIG. 4 illustrates an example of an operating environment 400 that may be representative of various embodiments. Operating environment 400 may include an exemplary graphical model tree 406 with three levels of recursion, n. In operating environment 400, a graph may be partitioned into a subgraph set 432 at recursion level n=0. For instance, the graph may be generated and partitioned into ancestor graphs 434-1, 434-2 and descendant graph 436. In various embodiments, each subgraph of subgraph set 432 may be independently partitioned a number of times, T, to create subgraph collections 440-1, 440-2, and 440-z at recursion level n=1. For example, ancestor subgraph 434-1 may be partitioned into numerous different subgraph sets comprised in subgraph collection 440-1. In such examples, a different subgraph set in subgraph collection 440-1 may be generated for each sample set in sample set collection 104. Additionally, ancestor subgraph 434-2 and descendant subgraph 436 may be similarly partitioned into subgraph set comprising subgraph collection 440-2 and subgraph collection 440-z, respectively. This process may be repeated at recursion level n=2 to generate subgraph collections 442-1, 442-2, 442-z based on subgraph collection 440-1, subgraph collections 444-1, 444-2, 444-z based on subgraph collection 440-2, and subgraph collections 446-1, 446-2, 446-z based on subgraph collection 440-z. Embodiments are not limited in this context.

It will be appreciated that only three recursions levels are illustrated in operating environment 400 for simplicity, however, any number of recursion levels could be used without departing from the scope of this disclosure. In some embodiments, each subgraph may be progressively partitioned (in a recursive manner) until a termination condition is satisfied to generate the graphical model tree 406 for a dataset (e.g., dataset 102). For example, the number, T, of samples sets in sample set collection 104 may be used to generate T sets of partitions, or subgraph sets in a subgraph collection, for each subgraph in a subgraph set. In such examples, the partitioning may be performed for each subgraph at each recursion level, n. Accordingly, the number of subgraphs in graphical model tree 406 may grow exponentially with the recursion level, n.

Figure 5:
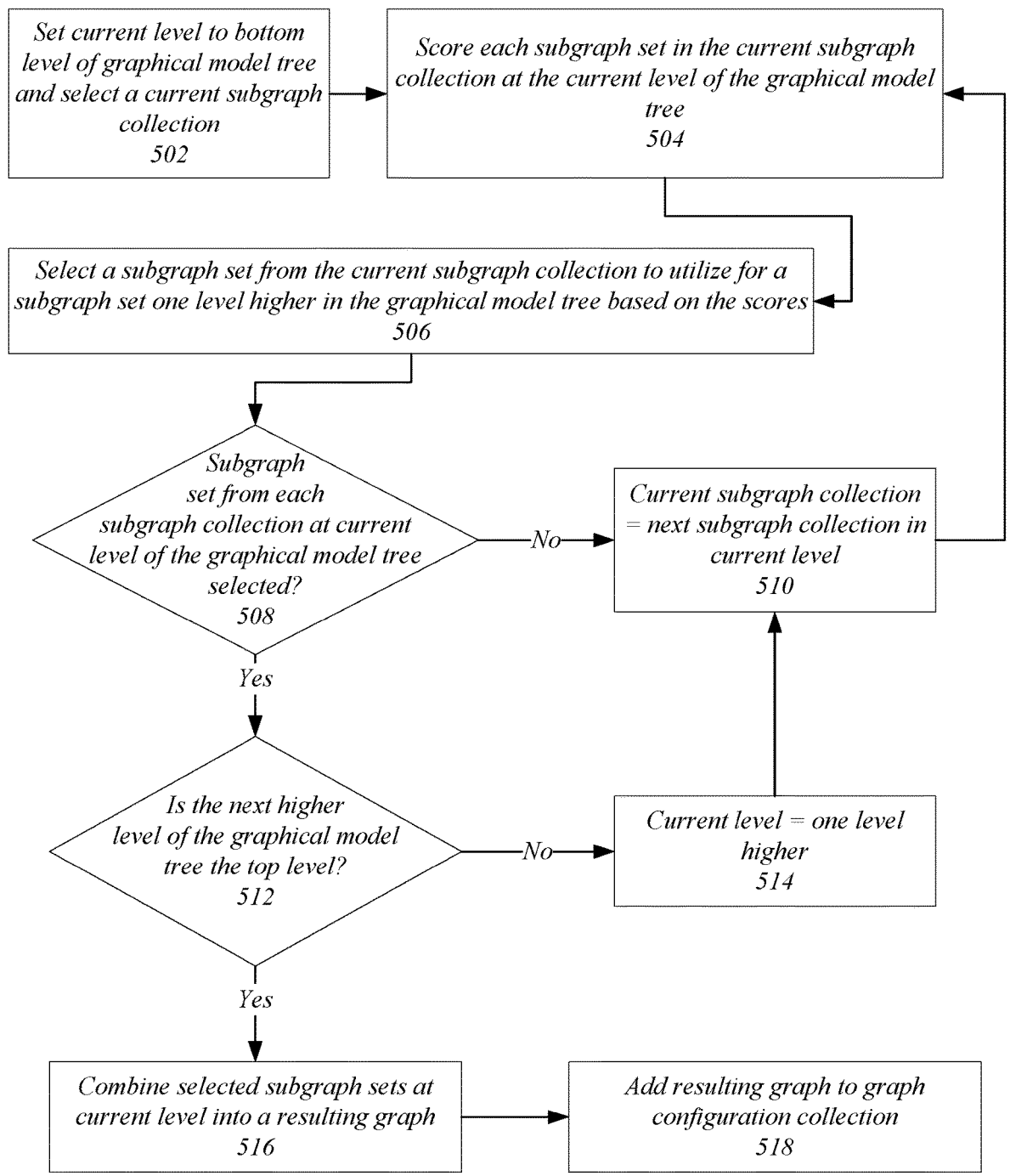
FIG. 5 illustrates an embodiment of a first logic flow.

FIG. 5 illustrates one embodiment of a logic flow 500, which may be representative of operations that may be executed in various embodiments in conjunction with determining one or more graphical models, or graphs, for graph configuration collection 108. In many embodiments, the graphical models may be converted into neural network topologies for NNT collection 110. The logic flow 500 may be representative of some or all of the operations that may be executed by one or more components described herein, such as graph configurator 107 or neural network converter 109. Embodiments are not limited in this context.

In the illustrated embodiment, logic flow 500 may begin at block 502. At block 502, "set current level to bottom level of graphical model tree and select a current subgraph collection" a current level may be set to a bottom level of a graphical model tree (i.e., n=max) and a current subgraph collection may be selected. For example, graph configurator 107 may select a subgraph collection in the bottom level of graphical model tree 106. At block 504 "score each subgraph set in the current subgraph collection at the current level of the graphical model tree" each subgraph set in the current subgraph collection at the current level of the graphical model tree may be scored. For example, a Bayesian score may be calculated for each subgraph set in the current subgraph collection at the current level of the graphical model tree 106.

Continuing to block 506 "select a subgraph set from the subgraph collection to utilize for a subgraph set one level higher in the graphical model tree based on the scores" a subgraph set in the current subgraph collection may be selected to utilize for a subgraph set one level higher in the graphical model tree based on the scores. For instance, the subgraph set with the highest Bayesian score may be selected. In another instance, probabilities of being selected may be assigned to each subgraph set based on a Bayesian score calculated to the respective subgraph set. In such other instances, the subgraph set in the current subgraph collection may be selected based on these probabilities.

Proceeding to block 508 "subgraph set from each subgraph collection at current level of the graphical model tree selected?" it may be determined whether a subgraph set from each subgraph collection at the current level of the graphical model tree has been selected. If a subgraph set has not been selected from each subgraph collection at the current level of the graphical model tree, then the logic flow 500 may proceed to block 510. At block 510 "current subgraph collection=next subgraph collection in current level" a subgraph collection in the current level for which a subgraph set has not been selected may be set as the current subgraph collection and the logic flow 500 may return to block 504 and proceed as described above.

Referring back to block 508, if a subgraph set has been selected from each subgraph collection in the current level, then the logic flow may proceed to block 512. At block 512 "is the next higher level of the graphical model tree the top level?" it may be determined if the next higher level of the graphical model tree is the top level (i.e., n=0). If the next higher level of the graphical model tree is not the top level, the logic flow 500 may proceed to block 514. At block 514 "current level=one level higher" the current level may be set to one level higher (i.e., n=n−1). Next, the logic flow 500 may return to block 510 and proceed as described above.

Referring back to block 512, if the next higher level of the graphical model tree is the top level, the logic flow may proceed to block 516. At block 516 "combine selected subgraph sets at current level into a resulting graph" the selected subgraph sets at the current level may be combined into a resulting graph. For instance, graph configurator 107 may combine the subgraph sets into a graph. Continuing to block 518 "add resulting graph to graph configuration collection", the resulting graph may be added to a graph configuration collection. For instance, graph configurator 107 may add the resulting graph to graph configuration collection 108.

FIG. 6 illustrates one embodiment of a logic flow 600, which may be representative of operations that may be executed in various embodiments in conjunctions with identifying a neural network topology. The logic flow 600 may be representative of some or all of the operations that may be executed by one or more components described herein, such as by sampler 103 or modeler 105. The embodiments are not limited in this context.

In the illustrated embodiments, logic flow 600 may begin at block 602. At block 602 "determine a collection of sample sets from a dataset, each sample set in the collection of sample sets drawn randomly from the dataset with replacement between drawings" a collection of sample set may be determined from a dataset by drawing randomly from the dataset with replacement between drawings. For example, sampler 103 may determine samples sets 220 in sample set collection 104 from dataset 102. Continuing to block 604 "partition a graph into a first set of subgraphs based on a first sample set in the collection of sample sets" a graph may be partitioned into a first set of subgraphs based on a first sample set in the collection of sample sets. For instance, modeler 105 may partition graph 330 into subgraph set 332-1 based on sample set 220-1.

Proceeding to block 606 "partition the graph into a second set of subgraphs based on a second sample set in the collection of sample sets, the second sample set different than the first sample set" the graph may be partitioned into a second, different, set of subgraphs based on a second sample set in the collection of samples sets. For instance, modeler 105 may partition graph 330 into subgraph set 332-2 based on sample set 220-2. At block 608 "determine a topology for a neural network based at least in part on the first set of subgraphs and the second set of subgraphs" a topology for a neural network may be determined based at least in part on the first and second sets of subgraphs. For instance, neural network converter 109 may convert a graph in graph configuration collection 108 that was determined based on analysis of subgraph sets 332-1, 332-2 into a neural network topology.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flow 500 of FIG. 5 and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
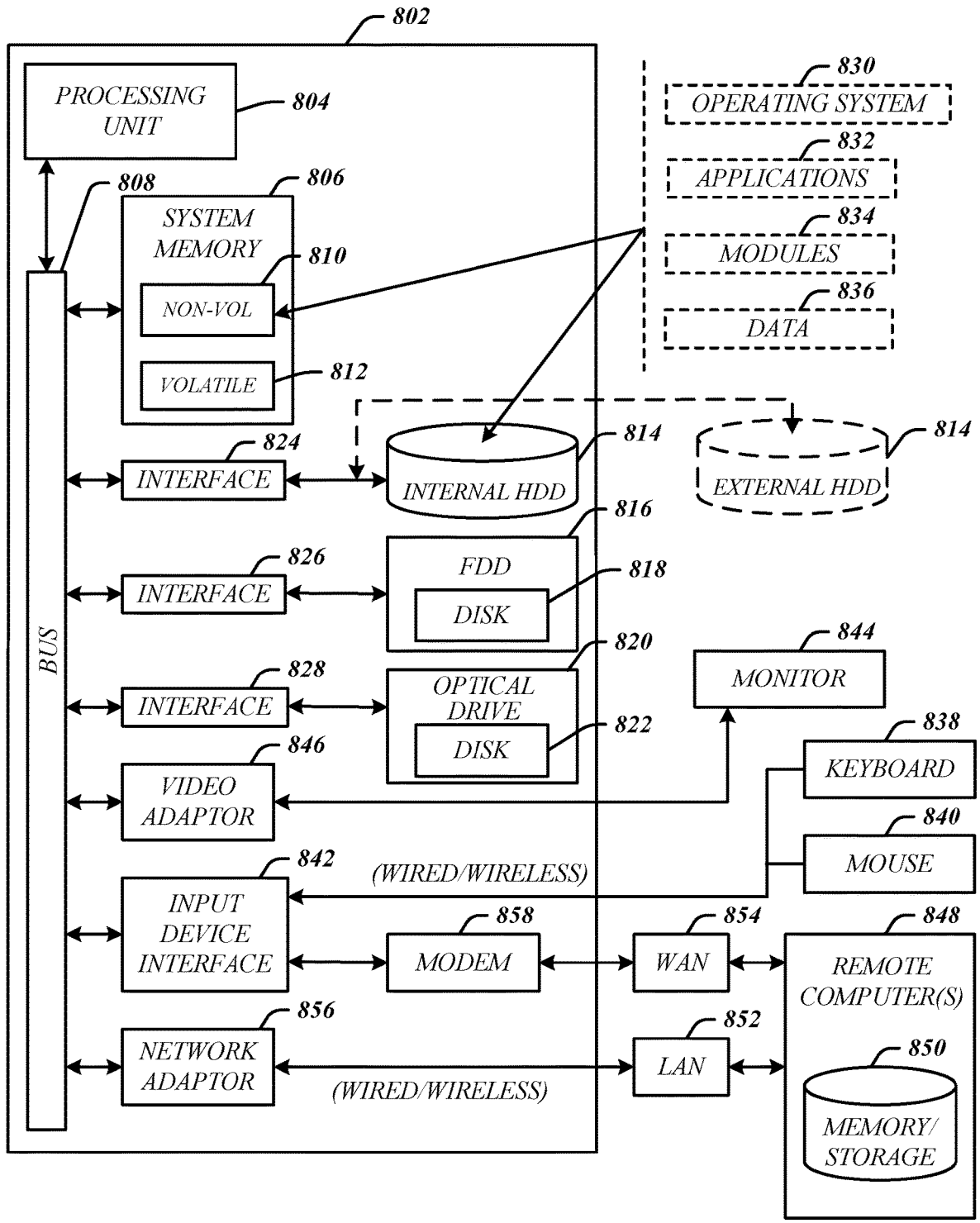
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a distributed processing system that implements or utilizes one or more components described herein. In some embodiments, computing architecture 800 may be representative, for example, of a compute node in a distributed processing system described herein that implements or utilizes one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of sampler 103, modeler 105, graph configurator 107, or neural network converter 109.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
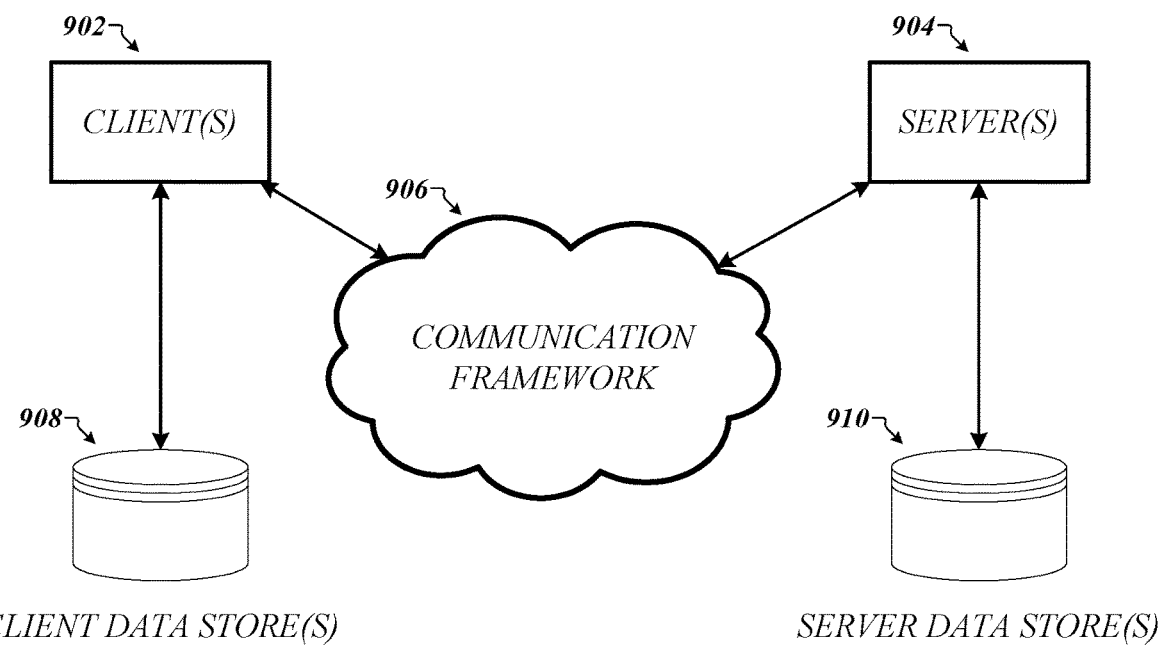
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments communications architecture may include one or more portions of sampler 103, modeler 105, graph configurator 107, and/or neural network converter 109. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910. In one or more embodiments, one or more of client data store(s) 908 or server data store(s) 910 may include memory accessible to one or more components of sampler 103, modeler 105, graph configurator 107, or neural network converter 109.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a memory; and logic, at least a portion of the logic implemented in circuitry coupled to the memory, the logic to: determine a collection of sample sets from a dataset, each sample set in the collection of sample sets drawn randomly from the dataset with replacement between drawings; —partition a graph into a first set of subgraphs based on a first sample set in the collection of sample sets; partition the graph into a second set of subgraphs based on a second sample set in the collection of sample sets, the second sample set different than the first sample set; and determine a topology for a neural network based at least in part on the first set of subgraphs or the second set of subgraphs.

Example 2 includes the subject matter of Example 1, each of the first and second sets of subgraphs comprising a descendent subgraph and two or more ancestor subgraphs.

Example 3 includes the subject matter of Example 1, the logic to partition the graph into the first and second sets of subgraphs based on conditional independence testing.

Example 4 includes the subject matter of Example 1, the logic to calculate a first score for the first set of subgraphs and a second score for the second set of subgraphs, wherein the first and second scores are calculated based on the dataset.

Example 5 includes the subject matter of Example 4, the logic to select the first set of subgraphs or the second set of subgraphs to utilize in determination of the topology for the neural network based on the first score and the second score.

Example 6 includes the subject matter of Example 4, the first and second scores comprising Bayesian scores.

Example 7 includes the subject matter of Example 1, the logic to generate the graph based on the dataset.

Example 8 includes the subject matter of Example 1, the logic to: determine the topology for the neural network based at least in part on the first set of subgraphs; and determine the topology for a second neural network based at least in part on the second set of subgraphs.

Example 9 includes the subject matter of Example 1, the logic to generate the graph based at least in part on the dataset or the collection of sample sets.

Example 10 includes the subject matter of Example 9, the logic to generate the graph based on probabilistic graphical modeling.

Example 11 is at least one non-transitory computer-readable medium comprising a set of instructions that, in response to being executed by a processor circuit, cause the processor circuit to: determine a collection of sample sets from a dataset, each sample set in the collection of sample sets drawn randomly from the dataset with replacement between drawings; partition a graph into a first set of subgraphs based on a first sample set in the collection of sample sets; partition the graph into a second set of subgraphs based on a second sample set in the collection of sample sets, the second sample set different than the first sample set; and determine a topology for a neural network based at least in part on the first set of subgraphs or the second set of subgraphs.

Example 12 includes the subject matter of Example of claim 11, each of the first and second sets of subgraphs comprising a descendent subgraph and two or more ancestor subgraphs.

Example 13 includes the subject matter of Example of claim 11, comprising instructions that, in response to being executed by the processor circuit, cause the processor circuit to partition the graph into the first and second sets of subgraphs based on conditional independence testing.

Example 14 includes the subject matter of Example of claim 11, comprising instructions that, in response to being executed by the processor circuit, cause the processor circuit to calculate a first score for the first set of subgraphs and a second score for the second set of subgraphs, wherein the first and second scores are calculated based on the dataset.

Example 15 includes the subject matter of Example of claim 14, comprising instructions that, in response to being executed by the processor circuit, cause the processor circuit to select the first set of subgraphs or the second set of subgraphs to utilize in determination of the topology for the neural network based on the first score and the second score.

Example 16 includes the subject matter of Example of claim 14, the first and second scores comprising Bayesian scores.

Example 17 includes the subject matter of Example of claim 11, comprising instructions that, in response to being executed by the processor circuit, cause the processor circuit to generate the graph based on the dataset.

Example 18 includes the subject matter of Example of claim 11, comprising instructions that, in response to being executed by the processor circuit, cause the processor circuit to: determine the topology for the neural network based at least in part on the first set of subgraphs; and determine the topology for a second neural network based at least in part on the second set of subgraphs.

Example 19 includes the subject matter of Example of claim 11, comprising instructions that, in response to being executed by the processor circuit, cause the processor circuit to generate the graph based at least in part on the dataset or the collection of sample sets.

Example 20 includes the subject matter of Example of claim 19, comprising instructions that, in response to being executed by the processor circuit, cause the processor circuit to generate the graph based on probabilistic graphical modeling.

Example 21 is a computer-implemented method, comprising: determining a collection of sample sets from a dataset, each sample set in the collection of sample sets drawn randomly from the dataset with replacement between drawings; partitioning a graph into a first set of subgraphs based on a first sample set in the collection of sample sets; partitioning the graph into a second set of subgraphs based on a second sample set in the collection of sample sets, the second sample set different than the first sample set; and determining a topology for a neural network based at least in part on the first set of subgraphs or the second set of subgraphs.

Example 22 includes the subject matter of Example 21, each of the first and second sets of subgraphs comprising a descendent subgraph and two or more ancestor subgraphs.

Example 23 includes the subject matter of Example 21, comprising partitioning the graph into the first and second sets of subgraphs based on conditional independence testing.

Example 24 includes the subject matter of Example 21, comprising calculating a first score for the first set of subgraphs and a second score for the second set of subgraphs, wherein the first and second scores are calculated based on the dataset.

Example 25 includes the subject matter of Example 24, comprising selecting the first set of subgraphs or the second set of subgraphs to utilize in determination of the topology for the neural network based on the first score and the second score.

Example 26 includes the subject matter of Example 24, the first and second scores comprising Bayesian scores.

Example 27 includes the subject matter of Example 21, comprising generating the graph based on the dataset.

Example 28 includes the subject matter of Example 21, comprising: determining the topology for the neural network based at least in part on the first set of subgraphs; and determining the topology for a second neural network based at least in part on the second set of subgraphs.

Example 29 includes the subject matter of Example 21, comprising generating the graph based at least in part on the dataset or the collection of sample sets.

Example 30 includes the subject matter of Example 29, comprising generating the graph based on probabilistic graphical modeling.

Example 31 is an apparatus, comprising: means for determining a collection of sample sets from a dataset, each sample set in the collection of sample sets drawn randomly from the dataset with replacement between drawings; means for partitioning a graph into a first set of subgraphs based on a first sample set in the collection of sample sets; means for partitioning the graph into a second set of subgraphs based on a second sample set in the collection of sample sets, the second sample set different than the first sample set; and means for determining a topology for a neural network based at least in part on the first set of subgraphs or the second set of subgraphs.

Example 32 includes the subject matter of Example 31, each of the first and second sets of subgraphs comprising a descendent subgraph and two or more ancestor subgraphs.

Example 33 includes the subject matter of Example 31, comprising means for partitioning the graph into the first and second sets of subgraphs based on conditional independence testing.

Example 34 includes the subject matter of Example 31, comprising means for calculating a first score for the first set of subgraphs and a second score for the second set of subgraphs, wherein the first and second scores are calculated based on the dataset.

Example 35 includes the subject matter of Example 34, comprising means for selecting the first set of subgraphs or the second set of subgraphs to utilize in determination of the topology for the neural network based on the first score and the second score.

Example 36 includes the subject matter of Example 34, the first and second scores comprising Bayesian scores.

Example 37 includes the subject matter of Example 31, comprising means for generating the graph based on the dataset.

Example 38 includes the subject matter of Example 31, comprising: means for determining the topology for the neural network based at least in part on the first set of subgraphs; and means for determining the topology for a second neural network based at least in part on the second set of subgraphs.

Example 39 includes the subject matter of Example 31, comprising means for generating the graph based at least in part on the dataset or the collection of sample sets.

Example 40 includes the subject matter of Example 39, comprising means for generating the graph based on probabilistic graphical modeling.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, the apparatus comprising:
a memory; and logic, at least a portion of the logic implemented in circuitry coupled to the memory, the logic to:

determine a collection of sample sets from a dataset, each sample set in the collection of sample sets drawn randomly from the dataset with replacement between drawings;

generate a graphical model tree based on the sample set collection and the dataset;

partition the graphical model tree into a plurality of subgraphs, one subgraph associated with each sample set in the collection of sample sets;

recursively partition each of the plurality of subgraphs into a plurality of levels of subgraphs;

calculate a score of each subgraph at each level of recursion, the score representing a likelihood of explaining a sample set of data by the subgraph;

at each recursive level of subgraphs, choose a subgraph with a highest score for inclusion at a next highest level of the graphical model tree and discard all other subgraphs at that level of subgraphs, until reaching a highest level of the graphical model tree; and determine a topology for a neural network for each sample set based on the subgraph associated with that sample set.

2. The apparatus of claim 1, the partition of each of the subgraphs comprising a descendent subgraph and two or more ancestor subgraphs.

3. The apparatus of claim 1, the logic to recursively partition the graphical model tree into the plurality of levels of subgraphs based on conditional independence testing.

4. The apparatus of claim 1, wherein the scores for each subgraph are calculated based on the dataset.

5. The apparatus of claim 4, the scores for each subgraph comprising Bayesian scores.

6. The apparatus of claim 1, the logic to generate the graphical model tree based on probabilistic graphical modeling.

7. At least one non-transitory computer-readable medium comprising a set of instructions that, in response to being executed by a processor circuit, cause the processor circuit to:

determine a collection of sample sets from a dataset, each sample set in the collection of sample sets drawn randomly from the dataset with replacement between drawings;

generate a graphical model tree based on the sample set collection and the dataset;

partition the graphical model tree into a plurality of subgraphs, one subgraph associated with each sample set in the collection of sample sets;

recursively partition each of the plurality of subgraphs into a plurality of levels of subgraphs;

calculate a score of each subgraph at each level of recursion, the score representing a likelihood of explaining a sample set of data by the subgraph;

at each recursive level of subgraphs, choose a subgraph with a highest score for inclusion at a next highest level of the graphical model tree and discard all other subgraphs at that level of subgraphs, until reaching a highest level of the graphical model tree; and determine a topology for a neural network for each sample set based on the subgraph associated with that sample set.

8. The at least one non-transitory computer-readable medium of claim 7, the partition of each of the subgraphs comprising a descendent subgraph and two or more ancestor subgraphs.

9. The at least one non-transitory computer-readable medium of claim 7, comprising instructions that, in response to being executed by the processor circuit, cause the processor circuit to recursively partition the graphical model tree into the plurality of levels of subgraphs based on conditional independence testing.

10. The at least one non-transitory computer-readable medium of claim 7, comprising instructions that, in response to being executed by the processor circuit, cause the processor circuit wherein the scores for each subgraph are calculated based on the dataset.

11. The at least one non-transitory computer-readable medium of claim 10, the scores for each subgraph comprising Bayesian scores.

12. The at least one non-transitory computer-readable medium of claim 7, comprising instructions that, in response to being executed by the processor circuit, cause the processor circuit to generate the graphical model tree based on probabilistic graphical modeling.

13. A computer-implemented method, comprising:

determining a collection of sample sets from a dataset, each sample set in the collection of sample sets drawn randomly from the dataset with replacement between drawings;

generating a graphical model tree based on the sample set collection and the dataset;

partitioning the graphical model tree into a plurality of subgraphs, one subgraph associated with each sample set in the collection of sample sets;

recursively partitioning each of the plurality of subgraphs into a plurality of levels of subgraphs;

calculating a score of each subgraph at each level of recursion, the score representing a likelihood of explaining a sample set of data by the subgraph;

at each recursive level of subgraphs, choosing a subgraph with a highest score for inclusion at a next highest level of the graphical model tree and discarding all other subgraphs at that level of subgraphs, until reaching a highest level of the graphical model tree; and determining a topology for a neural network for each sample set based on the subgraph associated with that sample set.

14. The computer-implemented method of claim 13, the partitioning of each of the subgraphs comprising a descendent subgraph and two or more ancestor subgraphs.

15. The computer-implemented method of claim 13, comprising recursively partitioning the graphical model tree into the plurality of levels of subgraphs based on conditional independence testing.

* * * * *